US012761797B2

(12) United States Patent
Sankaranarayanan et al.

(10) Patent No.: US 12,761,797 B2
(45) Date of Patent: Oct. 13, 2026

(54) DETERMINING PERIODIC DATA BASED ON DISCARD PATTERNS

(71) Applicant: Micron Technology, Inc., Boise, ID (US)

(72) Inventors: Sundararajan Sankaranarayanan, Fremont, CA (US); Chandra Mouli Guda, Fremont, CA (US); John Mazzie, Cedar Park, TX (US); Sujit Somandepalli, Austin, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/970,311

(22) Filed: Dec. 5, 2024

(65) Prior Publication Data

US 2025/0199686 A1 Jun. 19, 2025

Related U.S. Application Data

(60) Provisional application No. 63/612,039, filed on Dec. 19, 2023.

(51) Int. Cl.
*G06F 3/06* (2006.01)

(52) U.S. Cl.
CPC .......... *G06F 3/0611* (2013.01); *G06F 3/0659* (2013.01); *G06F 3/0679* (2013.01)

(58) Field of Classification Search
CPC .... G06F 3/0611; G06F 3/0659; G06F 3/0679; G06F 3/0656
USPC .................................................. 711/103, 154
See application file for complete search history.

(56) References Cited

U.S. PATENT DOCUMENTS

2008/0198671 A1* 8/2008 Wang ...................... G06F 5/065 365/189.05
2014/0215129 A1* 7/2014 Kuzmin .............. G06F 12/0246 711/103
2021/0374003 A1* 12/2021 Helmick ............... G06F 3/0679
2023/0004389 A1* 1/2023 Williams ............ G06F 9/30109

* cited by examiner

*Primary Examiner* — Than Nguyen
(74) *Attorney, Agent, or Firm* — Schwegman Lundberg & Woessner, P.A.

(57) ABSTRACT

The disclosure configures a memory sub-system controller to receive a request to store a set of data to a set of memory components and determine whether the set of data corresponds to a periodic commit stream or other operations. The controller selects one or more write cursors from a plurality of write cursors to associate with the set of data in response to determining whether the set of data corresponds to the periodic commit stream or the other operations. The controller programs the set of data to one or more of the set of memory components according to a data layout associated with the selected one or more write cursors.

20 Claims, 5 Drawing Sheets

DETERMINING PERIODIC DATA BASED ON DISCARD PATTERNS

PRIORITY APPLICATION

This application claims the benefit of priority to U.S. Provisional Application Ser. No. 63/612,039, filed Dec. 19, 2023, which is incorporated herein by reference in its entirety.

TECHNICAL FIELD

Examples of the disclosure relate generally to memory sub-systems and, more specifically, to providing adaptive media management for memory components, such as memory dies.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components.

BRIEF DESCRIPTION OF THE DRAWINGS

The present disclosure will be understood more fully from the detailed description given below and from the accompanying drawings of various examples of the disclosure.

DETAILED DESCRIPTION

Figure 1:
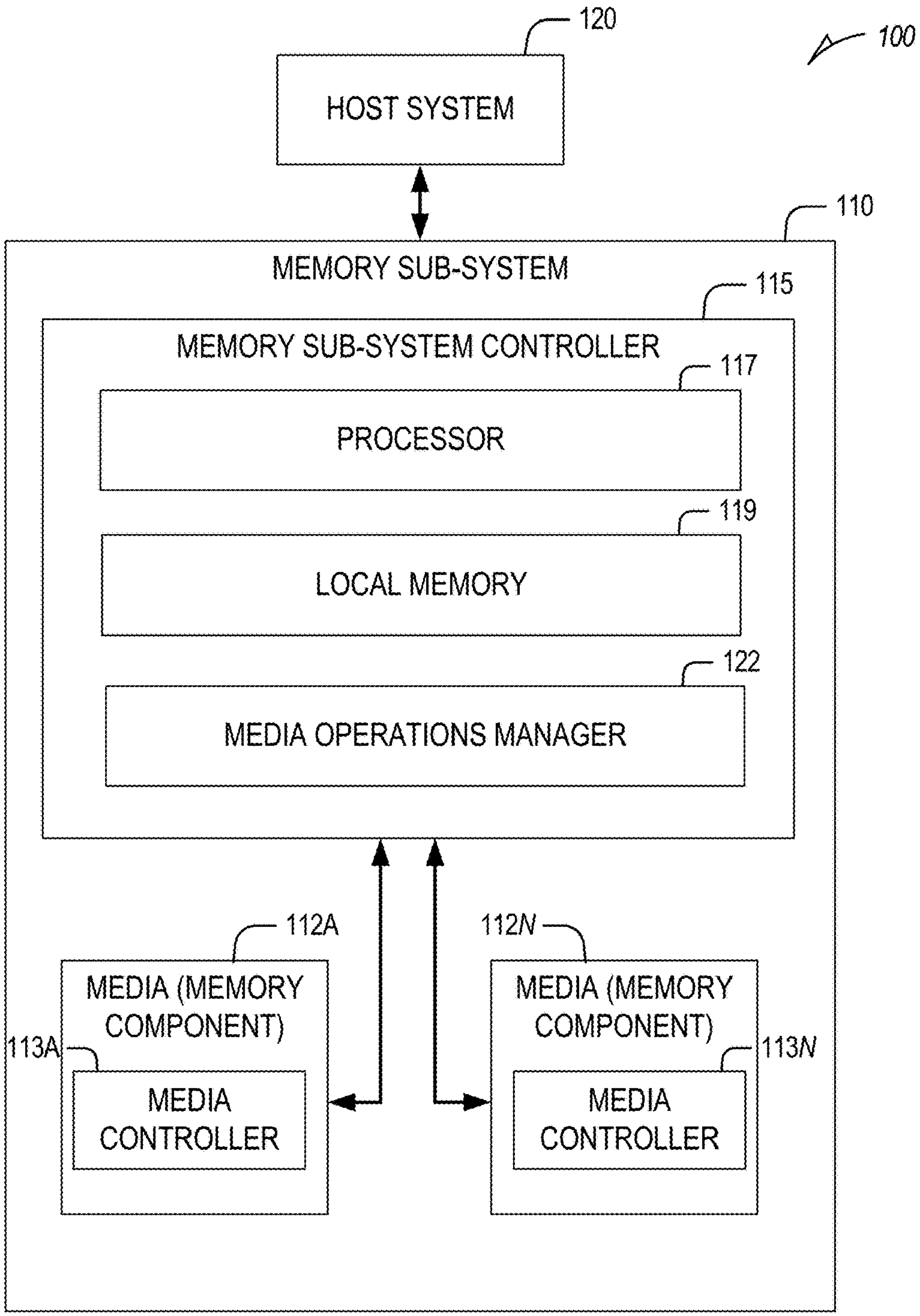
FIG. 1 is a block diagram illustrating an example computing environment including a memory sub-system, in accordance with some examples of the present disclosure.

Examples of the present disclosure configure a system component, such as a memory sub-system controller, to selectively store data in a first data layout or a second data layout based on whether that data corresponds to periodic commit operations or other operation, such as flush operations. The controller can receive a request to store a set of data and can determine whether the set of data corresponds to a periodic commit stream or other operation. The controller assigns a first write cursor to the data if the data is determined to correspond to the periodic commit stream and a second write cursor if the data is determined to correspond to the other operation. Each write cursor programs a respective collection of data to memory components in a different data layout. The data layout programmed by the first write cursor can program the data sequentially across a group of dies and planes together while the data layout programmed by the second write cursor can program different portions of the data across another group of planes of one or more dies. By grouping data corresponding to a periodic commit stream into the same set of write cursors, write amplification can be reduced, which improves the overall efficiencies of operating the memory sub-system. In this way, the controller can improve the storage and retrieval of data from the memory components and reduce latency.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices (e.g., memory dies or planes across multiple memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data."

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data". "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

Many different media management operations can be performed on the memory device. For example, the media management operations can include different scan rates, different scan frequencies, different wear leveling, different read disturb management, different near miss error correction (ECC), and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scans read all data and identify the error status of all blocks as a background operation. If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., NAND devices), each plane is comprised of a set of physical blocks. For some memory devices, blocks are the smallest area than can be erased. Such blocks can be referred to or addressed as logical units (LUN). Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

Host systems usually maintain a circular buffer (e.g., by an operating system) to periodically store data to the memory sub-system. The circular buffer can be associated with a set of logical block addresses (LBAs) of the memory sub-system. As data is written or added to the circular buffer, the host system transmits requests to program the data to the memory sub-system. The memory sub-system then stores the data in memory blocks or locations associated with the set of LBAs. The LBAs may be adjacent to each other or randomly distributed. Data can be stored in the circular buffer at a relatively high frequency. Once the host systems determine there is a need to permanently retain the data that is in the circular buffer, it is packaged into a larger data structure (such as Sorted String tables or SS Tables) and committed to the media. This is, in certain cases, referred to as Memtable Flush.

Conventional memory sub-systems are usually unable to determine whether a request to program data is generated based on data written to the circular buffer or based on other operations, such as a flush operation or the Memtable Flush command. Namely, the host issues program commands to the memory sub-systems without specifying whether the command resulted from data being placed in the circular buffer (e.g., without indicating whether the data corresponds to periodic commit operations). As such, conventional memory sub-systems use the same data layout for storing data regardless of the type of data (e.g., regardless of whether the data is associated with a periodic commit stream or is associated with other operations). Namely, such memory sub-systems use the same write cursor and cache to store data across multiple dies or a single die because the memory sub-systems are unaware of whether the LBAs specified by the host correspond to periodic commit operations or not.

As a result, data is fragmented across the memory sub-system. This can result in wasted space and can slow down retrieval or reading such data. Namely, by interleaving different types of data, more memory blocks/pages need to be consumed to store a sequence of data, potentially across multiple rows/planes of multiple dies, which can require multiple reads to be performed to retrieve a given collection of data. Also, writing periodic data across multiple blocks/pages/planes can increase the write amplification as those blocks/pages/planes need to be erased more often than would otherwise be needed if the data was collected together on fewer blocks/pages/planes. This reduces the efficiency at which data is read/stored on the memory sub-systems. Namely, applying a one-size-fits-all approach to storing data is inefficient and may still result in poor memory performance. This can slow down the overall memory sub-system and can prolong performing other operations, which introduces inefficiencies.

Examples of the present disclosure address the above and other deficiencies by providing a memory controller that can selectively store data in a first data layout or a second data layout based on whether that data corresponds to periodic commit stream or other operation, such as a flush operation. Specifically, the controller can receive a request to program data to the memory sub-system. The controller can maintain a table that associates different portions of the address space with discard counters to track frequency of writes/discard operations for each portion of the address space. Based on the table, the controller can determine which portion of the address space is frequently written to in order to group together requests to write data to that portion to which data is frequently written.

Namely, the table allows the memory controller to identify a set of LBAs that correspond to periodic commit operations received from the host, which enables the memory controller to group such LBAs sequentially across memory blocks/planes/pages/stripes. This increases the overall efficiency of operating the memory sub-system because rather than programming data associated with periodic requests across multiple planes/dies of the memory sub-system, the memory controller groups such data together on a smaller subset of planes/dies. This can reduce the number of erase operations that need to be performed for data that is periodically written (e.g., logical block addresses (LBAs) that are frequently written by the host).

In some examples, the memory controller receives a request to store a set of data to the set of memory components. The memory controller determines whether the set of data corresponds to a periodic commit stream or other operation. The memory controller selects one or more write cursors from a plurality of write cursors to associate with the set of data in response to determining whether the set of data corresponds to the periodic commit stream or the other operation and programs the set of data to one or more of the set of memory components according to a data layout associated with the selected one or more write cursors.

In some examples, a first write cursor of the plurality of write cursors corresponds to a first data layout, and a second write cursor of the plurality of write cursors corresponds to a second data layout. In some cases, the first write cursor is selected in response to determining that the set of data corresponds to the periodic commit stream, and the second write cursor is selected in response to determining that the set of data corresponds to the other operation. In some examples, the first write cursor groups a first collection of data on the one or more of the set of memory components together into a first set of block stripes, and the second write cursor stores a second collection of data on the one or more of the set of memory components in a second set of block stripes.

In some examples, the periodic commit stream corresponds to a circular buffer maintained by a host. The host can invalidate data associated with the circular buffer in response to the flush operation or discard command.

In some examples, the memory controller tracks patterns of discard commands received from a host to determine whether the set of data corresponds to the periodic commit stream or the other operation. In some cases, each discard command includes an identification of a set of logical block addresses (LBAs) that are invalid. In some cases, the memory controller divides an entire logical address space associated with the set of memory components into a plurality of regions, each region of the plurality of regions representing a different portion of the logical address space. The memory controller stores a table that associates each region of the plurality of regions with a respective discard counter. In some examples, each of the plurality of regions is of equal size. In some examples, a first region of the plurality of regions is of a different size than a second region of the plurality of regions.

In some examples, a first portion of the table includes a first identifier of a first region of the plurality of regions and a first discard counter and a second portion of the table includes a second identifier of a second region of the plurality of regions and a second discard counter. In some cases, the memory controller receives a discard command from the host that identifies a group of logical block addresses (LBAs) and determines that the group of LBAs identified by the program command is associated with the first region of the plurality of regions. The memory controller, in response to determining that the group of LBAs identified by the discard command is associated with the first region of the plurality of regions, increments the first discard counter.

In some examples, the memory controller determines that the set of data is associated with one or more LBAs corresponding to the first region. In some cases, the memory controller determines that the first discard counter transgresses a threshold value and, in response to determining that the first discard counter transgresses the threshold value, determines that the set of data corresponds to the periodic commit stream. In some cases, the discard command includes a request to invalidate data and is associated with an operating system discard operation. In some examples, the memory controller periodically resets one or more of the respective discard counters. In some cases, the discard counters can be incremented in response to program/write commands instead of discard commands.

Though various examples are described herein as being implemented with respect to a memory sub-system (e.g., a controller of the memory sub-system), some or all of the portions of an example can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies). Each memory die can include a plurality of planes in which data can be stored or programmed. In some cases, the first memory component 112A can be implemented by a first SSD (or a first independently operable memory sub-system) and the second memory component 112N can be implemented by a second SSD (or a second independently operable memory sub-system).

In some examples, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some examples, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL), a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe or CXL interface. The physical host interface can provide an interface for passing control, address, data, and other signals between the memory sub-system 110 and the host system 120.

The memory components 112A to 112N can include any combination of the different types of non-volatile memory components and/or volatile memory components and/or storage devices. An example of non-volatile memory components include a negative-and (NAND)-type flash memory. Each of the memory components 112A to 112N can include one or more arrays of memory cells such as single-level cells (SLCs) or multi-level cells (MLCs) (e.g., TLCs or QLCs). In some examples, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some examples, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells.

A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-inplace operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data. For example, a single first row that spans a first set of the pages or blocks of the memory components 112A to 112N can correspond to or be grouped as a first block stripe, and a single second row that spans a second set of the pages or blocks of the memory components 112A to 112N can correspond to or be grouped as a second block stripe.

The memory sub-system controller 115 can communicate with the memory components 112A to 112N to perform memory operations such as reading data, writing data, or erasing data at the memory components 112A to 112N and other such operations. The memory sub-system controller 115 can communicate with the memory components 112A to 112N to perform various memory management operations, such as enhancement operations, different scan rates, different scan frequencies, different wear leveling, different read disturb management, garbage collection operations, different near miss ECC operations, and/or different dynamic data refresh.

The memory sub-system controller 115 can include hardware, such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some examples, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another example of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify configuration data for the memory components 112A to 112N. The configuration data can describe the lifetime (maximum) PEC values and/or reliability grades associated with different groups of the memory components 112A to 112N and/or different blocks within each of the memory components 112A to 112N. The configuration data can also include various manufacturing information for individual memory components of the memory components 112A to 112N. The manufacturing information can specify the reliability metrics/information associated with each memory component. The configuration data can also store information indicating a first data layout for the data corresponding to a periodic commit stream (e.g., periodically written data) and a second data layout for data corresponding to a flush operation (that invalidates data stored in a circular buffer or associated with the periodic commit stream). The configuration information for the first data and second data layouts can specify a quantity (number) of planes and quantity (number) of dies across which to program the data and/or quantity (number) of write cursors to associate with each type of data.

In some examples, the commands or operations received from the host system 120 can include a write/read command, which can specify or identify an individual memory component in which to program/read data. Based on the memory component specified by the write/read command, the memory sub-system controller 115 can program/read the data into/from one or more of the memory components 112A to 112N. The memory sub-system controller 115 can be responsible for other memory management operations, such as wear leveling operations, garbage collection operations, error detection and error-correcting code (ECC) operations, encryption operations, caching operations, and address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some examples, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which are raw memory devices combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

The memory sub-system controller 115 can include a media operations manager 122. The media operations manager 122 can be configured to selectively store data in a first data layout or a second data layout based on whether that data is periodic (part of a periodic commit stream) or associated with other operations (is non-periodic). Specifically, the media operations manager 122 can receive a request to program data to the memory sub-system. The media operations manager 122 can maintain a table that associates different portions of the address space with discard counters to track frequency of writes/discard operations for each portion of the address space. Based on the table, the media operations manager 122 can determine which portion of the address space is frequently written to in order to group together requests to write data to that portion to which data is frequently written. Namely, the table allows the media operations manager 122 to identify a set of LBAs that correspond to periodic commit operations received from the host system 120 which enables media operations manager 122 to group such LBAs sequentially across memory blocks/planes/pages/stripes. This increases the overall efficiency of operating the memory sub-system 110 because rather than programming data associated with periodic requests across multiple planes/dies of the memory sub-system, the media operations manager 122 groups such data together on a smaller subset of planes/dies. This can reduce the number of erase operations that need to be performed for data that is periodically written (e.g., logical block addresses (LBAs) that are frequently written by the host). This increases the overall efficiency of programming and reading data from the memory sub-system 110.

Depending on the example, the media operations manager 122 can comprise logic (e.g., a set of transitory or non-transitory machine instructions, such as firmware) or one or more components that causes the media operations manager 122 to perform operations described herein. The media operations manager 122 can comprise a tangible or non-tangible unit capable of performing operations described herein. Further details with regards to the operations of the media operations manager 122 are described below.

Figure 2:
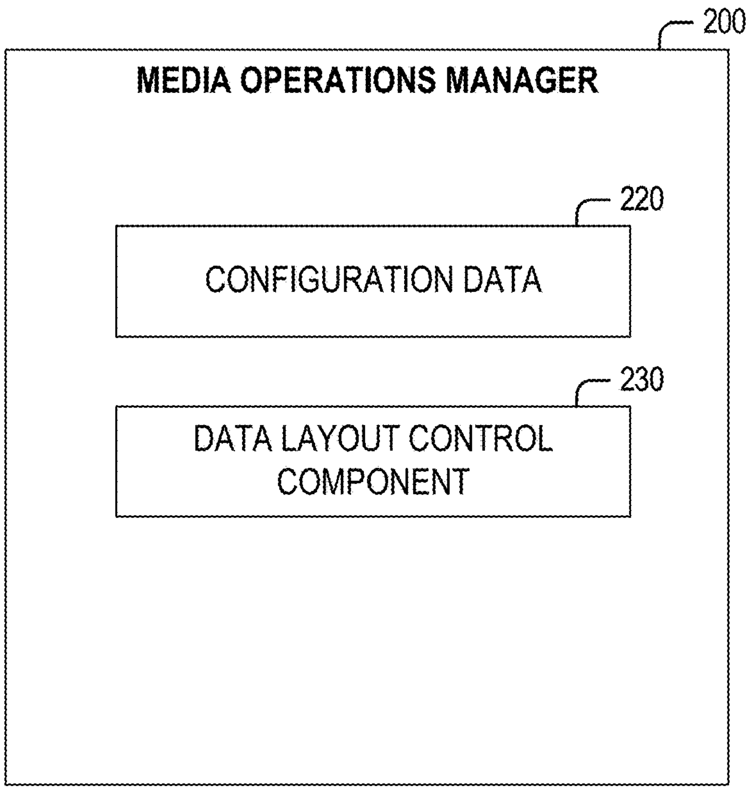
FIG. 2 is a block diagram of an example media operations manager, in accordance with some implementations of the present disclosure.

FIG. 2 is a block diagram of an example media operations manager 200 (corresponding to media operations manager 122 of FIG. 1), in accordance with some implementations of the present disclosure. As illustrated, the media operations manager 200 includes configuration data 220 and a data layout control component 230. For some examples, the media operations manager 200 can differ in components or arrangement (e.g., less or more components) from what is illustrated in FIG. 2.

The configuration data 220 accesses and/or stores configuration data associated with the memory components 112A to 112N of FIG. 1. In some examples, the configuration data 220 is programmed into the media operations manager 200. For example, the media operations manager 200 can communicate with the memory components 112A to 112N to obtain the configuration data 220 and store the configuration data 220 locally on the media operations manager 122. In some examples, the media operations manager 122 communicates with the host system 120 of FIG. 1. The host system 120 receives input from an operator or user that specifies parameters, including lifetime (maximum) PEC values of different bins, groups, blocks, block stripes, memory dies, manufacturing information, reliability information, confirmation information indicating different data layouts for data corresponding to periodic commit streams and data corresponding to flush operations, and/or configuration information indicating a number or quantity of write cursors to associate with data corresponding to the periodic commit streams and a number or quantity of write cursors to associate with data corresponding to flush operations (e.g., data that is determined to not be associated with periodic commit streams).

The media operations manager 122 can receive configuration data from the host system 120 and store the configuration data in the configuration data 220. The media operations manager 122 can update the configuration data 220 for various memory components over time. The data layout control component 230 can receive a request to store a set of data to the memory components 112A to 112N. The data layout control component 230 can process the set of data to determine whether the set of data corresponds to a periodic commit stream (e.g., is associated with a circular buffer on the host system 120) or data associated with other operations, such as flush operations. The data layout control component 230 can then access the configuration data 220 to determine the data layout to use for the set of data.

Figure 3:
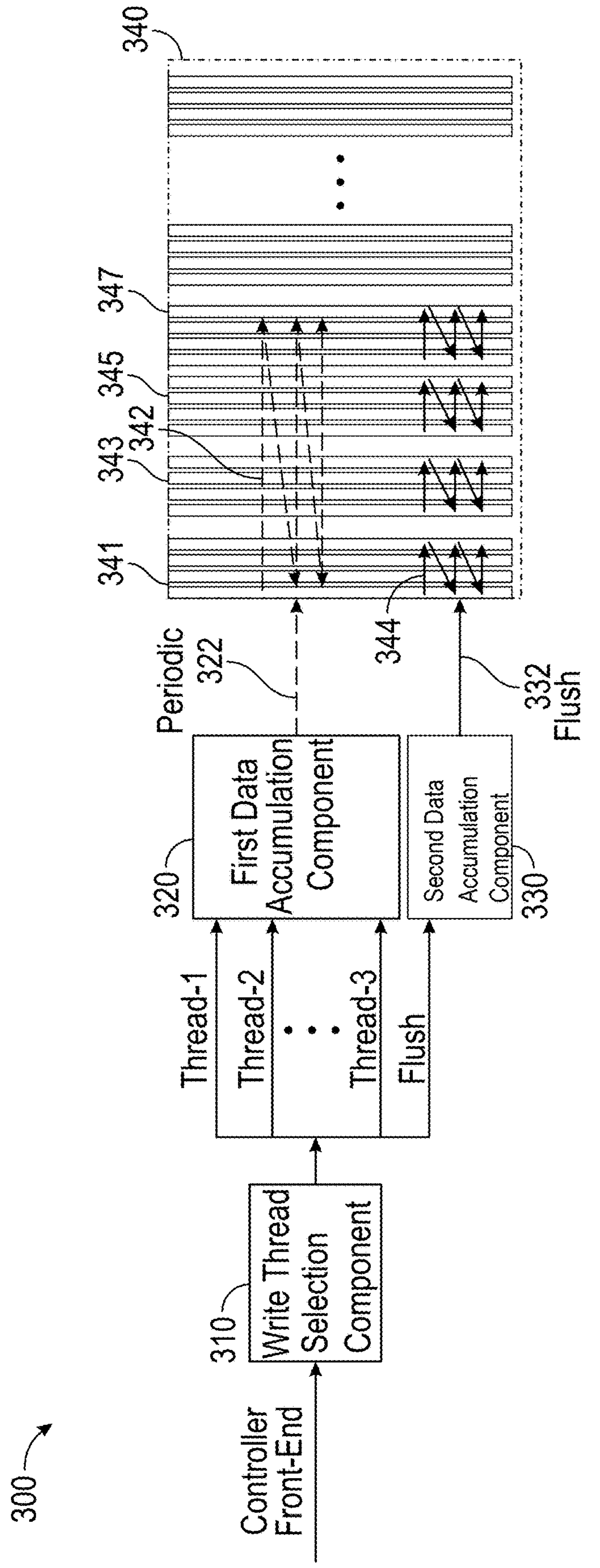
FIG. 3 illustrates storage of data in different data layouts based on whether data corresponds to a periodic commit stream or other operation, in accordance with some implementations of the present disclosure.

In some examples, the data layout control component 230 can be implemented using one or more of the components shown in diagram 300 of FIG. 3. Specifically, the data layout control component 230 can include a write thread selection component 310. The write thread selection component 310 can process incoming data and determine whether that data corresponds to a periodic commit stream or not (e.g., part of a flush operation). In response to determining that the incoming data is part of a thread corresponding to a periodic commit stream, the write thread selection component 310 provides the incoming data to the first data accumulation component 320. In response to determining that the incoming data is part of a thread corresponding to other operations, the write thread selection component 310 provides the incoming data to the second data accumulation component 330.

The first data accumulation component 320 can store one or more sequential write cursors. Each of the sequential write cursors can be programmed to store data using the data layout specified by the configuration data 220 for sequential data. For example, in an n-die layout, such as where n equals 4 data layout (but can take on any other integer value greater than one, such as 4, 8, and so forth), each write cursor of the first data accumulation component 320 can store a collection of data 322 in a queue and store that sequential data from the queue into multiple planes of a set of dies 340 (e.g., four dies in case of an n=4 data layout).

The second data accumulation component 330 can store a write cursor that is different from the write cursor of the first data accumulation component 320. The write cursor can be programmed to store data using the data layout specified by the configuration data 220 for data corresponding to other operations (e.g., flush operations) or normal write requests (non-periodic writes). For example, in an n=1 data layout, each write cursor of the data accumulation for flush component 330 can store a collection of data 332 in a queue and store that data from the queue into multiple planes of one die of the set of dies 340 (e.g., a single die in case of an n=1 data layout). For example, the second data accumulation for component 330 can store the collection of data 332 across multiple planes of the first die 341.

The first data accumulation component 320 can include a queue or cache (e.g., using SRAM) for storing a collection of data received from the write thread selection component 310. The queue or cache can be of a specified size or can be assigned a specified size that corresponds to the quantity of data that is stored sequentially across the set of dies 340.

As part of transferring the collection of data from the queue or cache to the set of dies 340, the first data accumulation component 320 divides the collection of data into separate groups. Each group represents a portion of the collection of data that is stored to an individual die of the set of dies 340. A first group of the collection of data can include a first portion of a first row of data stored across multiple planes 342 across multiple dies (e.g., the first die 341, the second die 343, the third die 345, and the fourth die 347) and a second portion of a second row of data stored across multiple planes 342 across the multiple dies (e.g., the first die 341, the second die 343, the third die 345, and the fourth die 347). The groups are arranged such that the first portion written to a first plane of the first die (e.g., plane 1 of the first die 341) follows in sequence and is adjacent in the sequence to the last portion written to the last plane of the last die (e.g., plane 4 of fourth die 347).

The second data accumulation component 330 can include a queue or cache (e.g., using SRAM) for storing a collection of data received from the write thread selection component 310. The queue or cache can be of a specified size or can be assigned a specified size that corresponds to the quantity of data that is stored across planes of an individual die of the set of dies 340. Specifically, the second data accumulation component 330 can generate a group of data 344 to be stored across planes of the same die (e.g., the first die 341) sequentially. In some cases, the second data accumulation component 330 can distribute data across an individual die rather than across multiple dies since parallel reads of random data are unlikely to be performed. In some cases, the second data accumulation component 330 distributes the data in a similar manner as the data accumulation component 320 across multiple dies, but the quantity of dies across which the random data is distributed is fewer or smaller than the number of dies across which the sequential data is distributed.

In some cases, the second data accumulation component 330 stores the collection of data in the same or similar manner as the first data accumulation component 320. For example, the second data accumulation component 330 can store a first portion of the group of data 344 across multiple planes 342 across multiple dies (e.g., the first die 341, the second die 343, the third die 345, and the fourth die 347) and a second portion of the group of data 344 across multiple planes 342 across the multiple dies (e.g., the first die 341, the second die 343, the third die 345, and the fourth die 347).

In some examples, in order to determine whether the data received from the host system 120 corresponds to the periodic commit stream, the write thread selection component 310 tracks discard patterns (or volume or writes) to different regions or portions of the address space over time. The write thread selection component 310 can determine that the data corresponds to a periodic commit stream if the LBA of the data is associated with a write frequency or discard pattern having a discard frequency that transgresses a discard or write threshold. Namely, if the data is written a specified quantity or number of times within a threshold period of time (which can be defined by the configuration data 220), the write thread selection component 310 determines that the data corresponds to the periodic commit stream. Otherwise, the write thread selection component 310 determines that the incoming data corresponds to other operations.

In some cases, the write thread selection component 310 divides an entire logical address space associated with the set of memory components 112A to 112N into a plurality of regions. Each region of the plurality of regions can represent a different portion of the logical address space. The quantity or number of regions used to represent the logical address space (e.g., how the entire logical address space is divided) can be determined based on the configuration data 220.

For example, the entire address space can correspond to 32 gigabytes (GB) of addressable space. In such cases, the write thread selection component 310 divides the 32 GB of addressable space into equal or non-equal regions, such as eight regions each representing a different 4 GB chunk of the 32 GB addressable space (in case the configuration data 220 specifies a division of the address space into eight regions or specifies the size of each region). Namely, the configuration data 220 can specify the size of each region, which is then used by the write thread selection component 310 to determine how many regions are needed to represent the entire address space, such as by dividing the entire addressable space by the specified size of each region. As an alternative, the configuration data 220 can specify the number of regions and the write thread selection component 310 can then set the size of each region by dividing the entire addressable space by the specified number of regions. The write thread selection component 310 stores a representation of each region in a respective row of a table. Each row in the table can associate an individual region with a corresponding discard counter. The discard counter can be used to track the volume of discard or write commands received in association with the corresponding region within a certain time interval.

The write thread selection component 310 can determine that a timer associated with a particular region has reached a specified value. In such cases, the write thread selection component 310 resets the discard counter that is maintained for that particular region. Namely, the table can store a first entry that identifies a first region of the regions of the addressable space and a first discard counter. The table can store a second entry that identifies a second region of the regions of the addressable space and a second discard counter. The first discard counter can be reset or restarted when a first timer associated with the first region reaches a first specified value and the second discard counter can be reset or restarted when a second timer associated with the second region reaches a second specified value. The first specified value can be the same or different from the second specified value to cause the first discard counter to be reset at the same time or at a different time than the second discard count.

The write thread selection component 310 can receive a discard command from the host system 120 that identifies a group of LBAs. The write thread selection component 310 can search the table to determine which region overlaps the entirety or a majority of the LBAs in the group of LBAs identified by the discard command. The write thread selection component 310, for example, can determine that the group of LBAs specifies a logical address that falls within the addressable space portion represented by the first region. In response, the write thread selection component 310 updates (e.g., increments) the first discard counter associated with the first region that is stored in the table. This process is repeated as each discard command is received from the host system 120. The write thread selection component 310 can periodically or continuously, or in response to each discard command, determine whether the current discard counter transgresses a specified value (e.g., which can be set by the configuration data 220). For example, the write thread selection component 310 can determine that the first discard counter has transgressed the specified value. Rather than tracking discard commands, similar functionality can be performed by tracking program commands.

In response to determining that the first discard counter has transgressed the specified value, the write thread selection component 310 determines that the volume of writes or discards associated with the first region (corresponding to the first discard counter) corresponds to a frequency representing or associated with a periodic commit stream. In such cases, the write thread selection component 310 can group or associate any write or discard command received from the host system 120 with the data accumulation component 320. In this way, the data that is being frequently programmed or invalidated in the set of memory components 112A to 112N is grouped together and written sequentially across the same set of stripes/blocks/pages using a same set of one or more write cursors. Namely, the write thread selection component 310 can receive a second request from the host system 120 to write data to a set of addresses that overlap the addressable space represented by the first region. The write thread selection component 310 can determine that the first region is associated with the first discard counter that transgresses the threshold value. The write thread selection component 310 can then group or associate the data associated with the second request received from the host system 120 with the first data accumulation component 320 for storage sequentially with other data previously received from the host to be programmed to the same first region.

In some examples, the write thread selection component 310 can receive a third request from the host system 120 to write data to a set of addresses that overlap the addressable space represented by the second region. The write thread selection component 310 can determine that the second region is associated with the second discard counter that fails to transgress the threshold value. The write thread selection component 310 can then group or associate the data associated with the third request received from the host system 120 with the component 330 for storage sequentially or non-sequentially with other data previously received from the host system 120 to be programmed to the second region or other region not associated with a periodic commit stream. The component 330 can store data using a single write cursor or a specified quantity or number of cursors.

Figure 4:
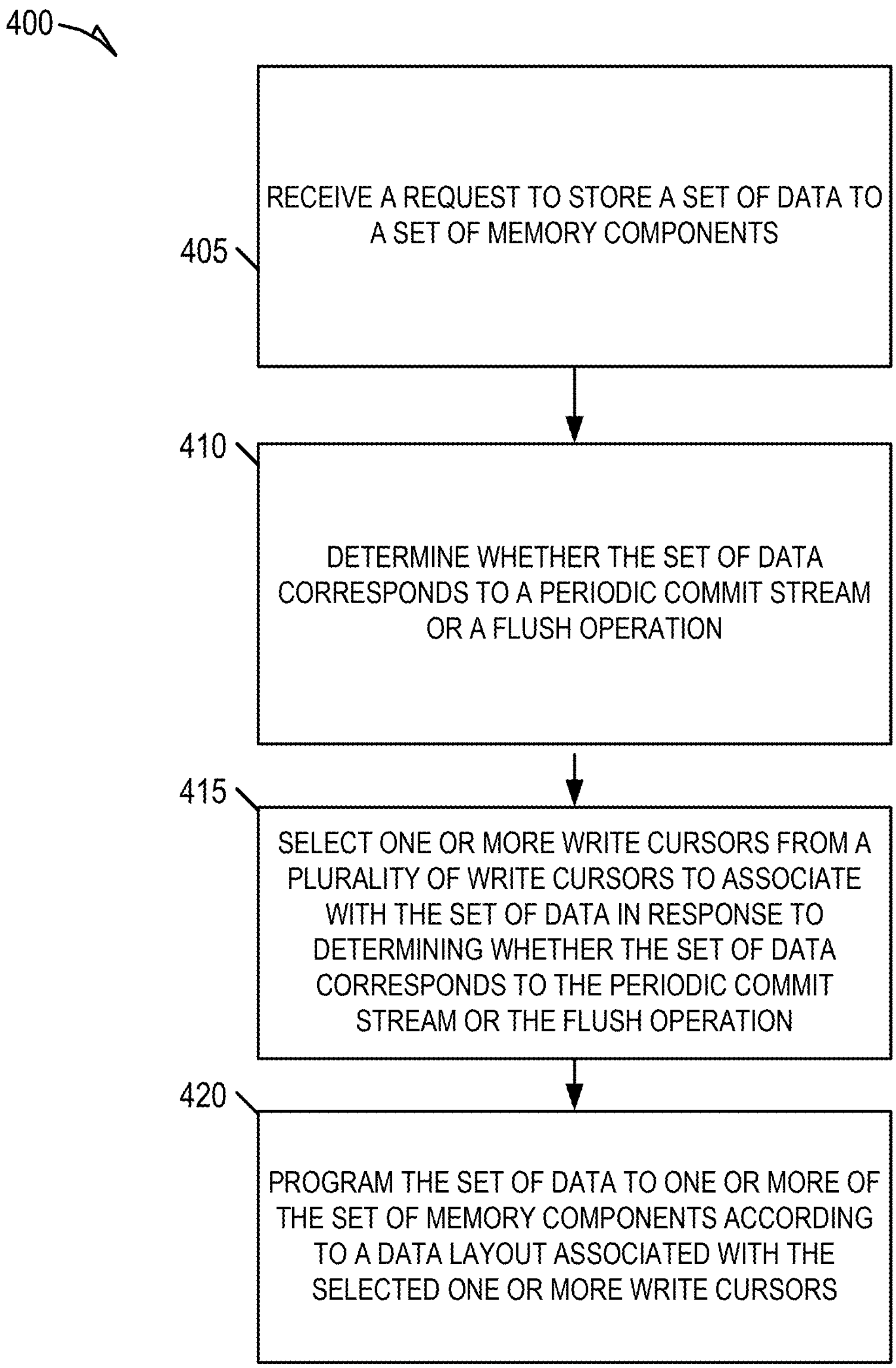
FIG. 4 is a flow diagram of an example method or process for a memory controller to program data corresponding to a periodic commit stream in a different data layout from data associated with other operations, in accordance with some implementations of the present disclosure.

FIG. 4 is a flow diagram of an example method 400 (or process) to allow a memory controller to program data corresponding to a periodic commit stream in a different data layout from data associated with a flush operation, in accordance with some implementations of the present disclosure. The method 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some examples, the method 400 is performed by the media operations manager 122 of FIG. 1. Although the processes are shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

Referring now to FIG. 4, the method (or process) 400 begins at operation 405, with a media operations manager 122 of a memory sub-system (e.g., memory sub-system 110) receiving a request to store a set of data to the set of memory components. Then, at operation 410, the media operations manager 122 determines whether the set of data corresponds to a periodic commit stream or other operation and, at operation 415, selects one or more write cursors from a plurality of write cursors to associate with the set of data in response to determining whether the set of data corresponds to the periodic commit stream or the other operation. At operation 420, the media operations manager 122 programs the set of data to one or more of the set of memory components according to a data layout associated with the selected one or more write cursors.

In view of the disclosure above, various examples are set forth below. It should be noted that one or more features of an example, taken in isolation or combination, should be considered within the disclosure of this application.

Example 1: A system comprising: a set of memory components of a memory sub-system; and at least one processing device operatively coupled to the set of memory components, the at least one processing device being configured to perform operations comprising: receiving a request to store a set of data to the set of memory components; determining whether the set of data corresponds to a periodic commit stream or other operation; selecting one or more write cursors from a plurality of write cursors to associate with the set of data in response to determining whether the set of data corresponds to the periodic commit stream or the other operation; and programming the set of data to one or more of the set of memory components according to a data layout associated with the selected one or more write cursors.

Example 2. The system of Example 1, wherein a first write cursor of the plurality of write cursors corresponds to a first data layout, and wherein a second write cursor of the plurality of write cursors corresponds to a second data layout.

Example 3. The system of Example 2, wherein the first write cursor is selected in response to determining that the set of data corresponds to the periodic commit stream, and wherein the second write cursor is selected in response to determining that the set of data corresponds to the other operation.

Example 4. The system of any one of Examples 2-3, wherein the first write cursor groups a first collection of data on the one or more of the set of memory components together into a first set of block stripes, and wherein the second write cursor stores a second collection of data on the one or more of the set of memory components in a second set of block stripes.

Example 5. The system of any one of Examples 1-4, wherein the periodic commit stream corresponds to a circular buffer maintained by a host, the host invalidating data associated with the circular buffer in response to the flush operation.

Example 6. The system of any one of Examples 1-5, the operations comprising: tracking patterns of discard commands received from a host to determine whether the set of data corresponds to the periodic commit stream or the other operation.

Example 7. The system of Example 6, wherein each discard command comprises an identification of a set of logical block addresses (LBAs) that are invalid.

Example 8. The system of any one of Examples 6-7, the operations comprising: dividing an entire logical address space associated with the set of memory components into a plurality of regions, each region of the plurality of regions representing a different portion of the logical address space; and storing a table that associates each region of the plurality of regions with a respective discard counter.

Example 9. The system of Example 8, wherein each of the plurality of regions is of equal size.

Example 10. The system of any one of Examples 8-9, wherein a first region of the plurality of regions is of a different size than a second region of the plurality of regions.

Example 11. The system of any one of Examples 8-10, wherein a first portion of the table comprises a first identifier of a first region of the plurality of regions and a first discard counter, wherein a second portion of the table comprises a second identifier of a second region of the plurality of regions and a second discard counter.

Example 12. The system of Example 11, the operations comprising: receiving a discard command from the host that identifies a group of logical block addresses (LBAs); determining that the group of LBAs identified by the discard command is associated with the first region of the plurality of regions; and in response to determining that the group of LBAs identified by the discard command is associated with the first region of the plurality of regions, incrementing the first discard counter.

Example 13. The system of Example 12, the operations comprising: determining that the set of data is associated with one or more LBAs corresponding to the first region.

Example 14. The system of Example 13, the operations comprising: determining that the first discard counter transgresses a threshold value; and in response to determining that the first discard counter transgresses the threshold value, determining that the set of data corresponds to the periodic commit stream.

Example 15. The system of Example 14, wherein the discard command comprises a request to invalidate data and is associated with an operating system discard operation.

Example 16. The system of any one of Examples 8-15, the operations comprising periodically resetting one or more of the respective discard counters.

Methods and computer-readable storage medium with instructions for performing any one of the above Examples.

Figure 5:
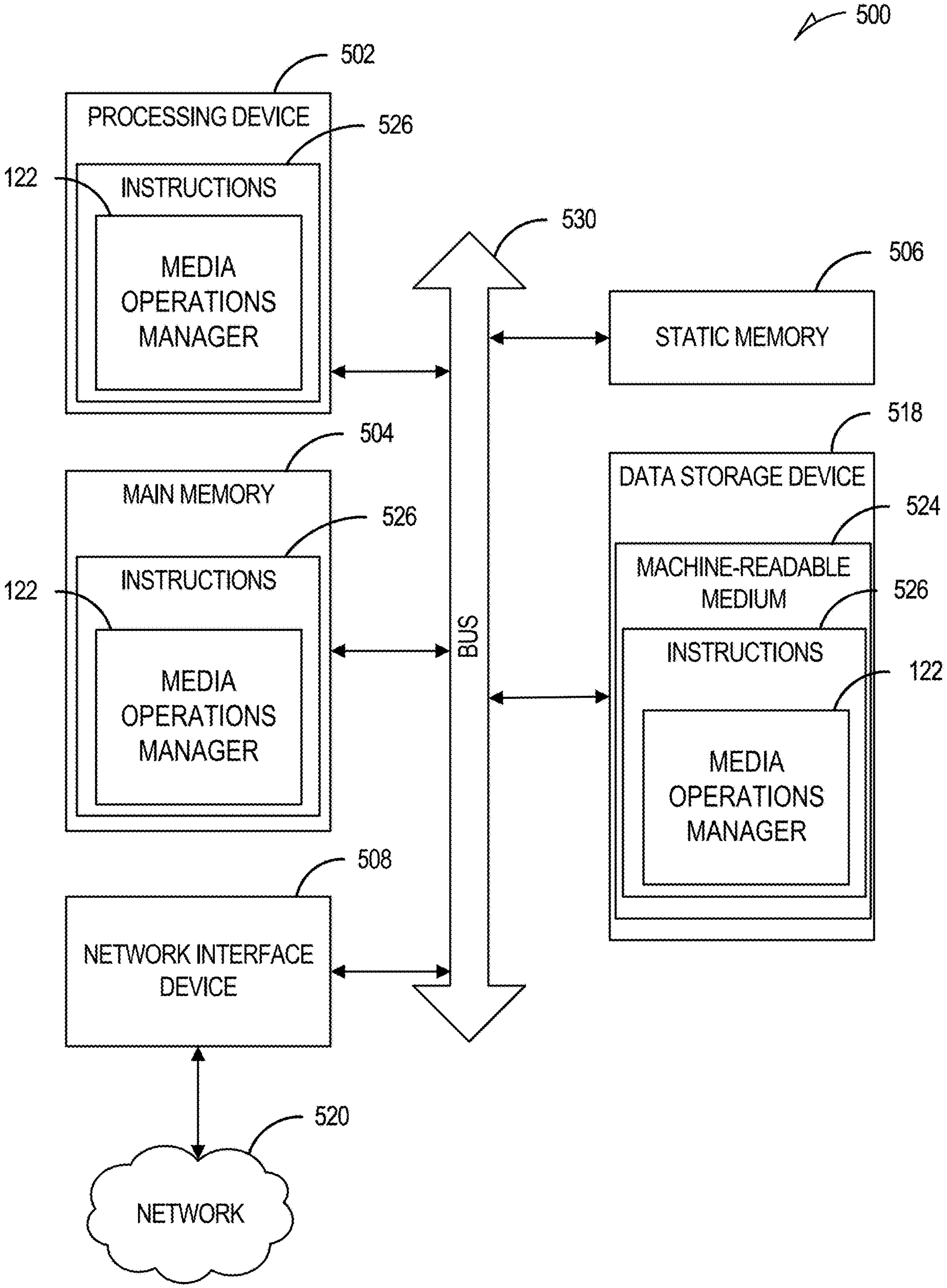
FIG. 5 is a block diagram illustrating a diagrammatic representation of a machine in the form of a computer system within which a set of instructions can be executed for causing the machine to perform any one or more of the methodologies discussed herein, in accordance with some examples of the present disclosure.

FIG. 5 illustrates an example machine in the form of a computer system 500 within which a set of instructions can be executed for causing the machine to perform any one or more of the methodologies discussed herein. In some examples, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative examples, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device 502 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), a network processor, or the like. The processing device 502 is configured to execute instructions 526 for performing the operations and steps discussed herein. The computer system 500 can further include a network interface device 508 to communicate over a network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one example, the instructions 526 implement functionality corresponding to the media operations manager 122 of FIG. 1. While the machine-readable storage medium 524 is shown in an example to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, the disclosure has been described with reference to specific examples thereof. It will be evident that various modifications can be made thereto without departing from the broader scope of the disclosure as set forth in the following claims. The specification and drawings are, accordingly, to be regarded in an illustrative sense rather than a restrictive sense.

What is claimed is:

1. A system comprising:

a set of memory components of a memory sub-system; and at least one processing device operatively coupled to the set of memory components, the at least one processing device being programmed to perform operations comprising:

receiving a request to store a set of data to the set of memory components;

determining whether the set of data corresponds to a periodic commit stream or other operations, the periodic commit stream corresponding to a circular buffer maintained by a host, the host invalidating data associated with the circular buffer in response to the other operation;

selecting one or more write cursors from a plurality of write cursors to associate with the set of data in response to determining whether the set of data corresponds to the periodic commit stream or the other operations; and programming the set of data to one or more of the set of memory components according to a data layout associated with the selected one or more write cursors.

2. The system of claim 1, wherein a first write cursor of the plurality of write cursors corresponds to a first data layout, and wherein a second write cursor of the plurality of write cursors corresponds to a second data layout.

3. The system of claim 2, wherein the first write cursor is selected in response to determining that the set of data corresponds to the periodic commit stream, and wherein the second write cursor is selected in response to determining that the set of data corresponds to the other operation.

4. The system of claim 2, wherein the first write cursor groups a first collection of data on the one or more of the set of memory components together into a first set of block stripes, and wherein the second write cursor stores a second collection of data on the one or more of the set of memory components in a second set of block stripes.

5. The system of claim 1, the operations comprising:

tracking patterns of discard commands received from the host to determine whether the set of data corresponds to the periodic commit stream or the other operations.

6. The system of claim 5, wherein each discard command comprises an identification of a set of logical block addresses (LBAs) that are invalid.

7. The system of claim 5, the operations comprising:

dividing an entire logical address space associated with the set of memory components into a plurality of regions, each region of the plurality of regions representing a different portion of the logical address space; and storing a table that associates each region of the plurality of regions with a respective discard counter.

8. The system of claim 7, wherein each of the plurality of regions is of equal size.

9. The system of claim 7, wherein a first region of the plurality of regions is of a different size than a second region of the plurality of regions.

10. The system of claim 7, wherein a first portion of the table comprises a first identifier of a first region of the plurality of regions and a first discard counter, wherein a second portion of the table comprises a second identifier of a second region of the plurality of regions and a second discard counter.

11. The system of claim 10, the operations comprising:

receiving a discard command from the host that identifies a group of logical block addresses (LBAs);

determining that the group of LBAs identified by the discard command is associated with the first region of the plurality of regions; and in response to determining that the group of LBAs identified by the discard command is associated with the first region of the plurality of regions, incrementing the first discard counter.

12. The system of claim 11, the operations comprising:

determining that the set of data is associated with one or more LBAs corresponding to the first region.

13. The system of claim 12, the operations comprising:

determining that the first discard counter transgresses a threshold value; and in response to determining that the first discard counter transgresses the threshold value, determining that the set of data corresponds to the periodic commit stream.

14. The system of claim 13, wherein the discard command comprises a request to invalidate data and is associated with an operating system discard operation.

15. The system of claim 7, the operations comprising periodically resetting one or more of the respective discard counters.

16. A method comprising:

receiving a request to store a set of data to a set of memory components;

determining whether the set of data corresponds to a periodic commit stream or other operations, the periodic commit stream corresponding to a circular buffer maintained by a host, the host invalidating data associated with the circular buffer in response to the other operation;

selecting one or more write cursors from a plurality of write cursors to associate with the set of data in response to determining whether the set of data corresponds to the periodic commit stream or the other operations; and programming the set of data to one or more of the set of memory components according to a data layout associated with the selected one or more write cursors.

17. The method of claim 16, wherein a first write cursor of the plurality of write cursors corresponds to a first data layout, and wherein a second write cursor of the plurality of write cursors corresponds to a second data layout.

18. The method of claim 17, wherein the first write cursor is selected in response to determining that the set of data corresponds to the periodic commit stream, and wherein the second write cursor is selected in response to determining that the set of data corresponds to the other operations.

19. A non-transitory computer-readable storage medium comprising instructions that, when executed by at least one processing device, cause the at least one processing device to perform operations comprising:

receiving a request to store a set of data to a set of memory components;

determining whether the set of data corresponds to a periodic commit stream or other operations;

selecting one or more write cursors from a plurality of write cursors to associate with the set of data in response to determining whether the set of data corresponds to the periodic commit stream or the other operations, a first write cursor of the plurality of write cursors corresponding to a first data layout, and a second write cursor of the plurality of write cursors corresponding to a second data layout, the first write cursor grouping a first collection of data on one or more of a set of memory components together into a first set of block stripes, and the second write cursor storing a second collection of data on the one or more of the set of memory components in a second set of block stripes; and programming the set of data to one or more of the set of memory components according to a data layout associated with the selected one or more write cursors.

20. The non-transitory computer-readable storage medium of claim 19, the periodic commit stream corresponding to a circular buffer maintained by a host, the host invalidating data associated with the circular buffer in response to the other operation.

* * * * *